United States Patent [19]

Lippmeier et al.

[11] Patent Number: 5,174,502

[45] Date of Patent: Dec. 29, 1992

[54] SUPPORT FOR A TRANSLATING NOZZLE VECTORING RING

[75] Inventors: William C. Lippmeier, Cincinnati; Todd T. Wilkinson; Robert M. Ausdenmoore, both of Chester, all of Ohio

[73] Assignee: General Electric Company, Cincinnati, Ohio

[21] Appl. No.: 698,045

[22] Filed: May 10, 1991

[51] Int. Cl.[5] ............................................. B64C 15/00
[52] U.S. Cl. ............................. 239/265.41; 239/265.19; 239/265.39; 60/228; 60/232
[58] Field of Search ...................... 239/265.19, 265.37, 239/265.39, 265.41; 60/228, 232; 74/202, 204, 205

[56] References Cited

U.S. PATENT DOCUMENTS

| | | | |
|---|---|---|---|
| 3,319,892 | 5/1967 | Zirin | 239/265.35 |
| 4,128,208 | 12/1978 | Ryan et al. | 239/265.39 |
| 4,176,792 | 12/1979 | McCardle | 239/265.41 |
| 4,245,787 | 1/1981 | Freid | 239/265.41 |
| 4,456,178 | 6/1984 | Jones et al. | 239/265.39 |
| 4,508,270 | 4/1985 | Joubert | 239/265.35 |
| 4,994,660 | 2/1991 | Hauer | 239/265.41 |
| 5,076,496 | 12/1991 | Lippmeier | 239/265.41 |
| 5,082,182 | 1/1992 | Bruchez, Jr. | 239/265.35 |

*Primary Examiner*—Kevin P. Shaver
*Assistant Examiner*—Lesley D. Morris
*Attorney, Agent, or Firm*—Jerome C. Squillaro; David L. Narciso

[57] ABSTRACT

The present invention provides support for a vectoring ring used to pivot flaps in a gas turbine engine thrust vectoring nozzle. The ring support transfers at least a portion of the side loads acting generated by a gas turbine engine thrust vectoring nozzle to a relatively stationary portion of the engine. The support includes apparatus that provides for allowing two degree of freedom (2 DOF) pivoting or gimballing motion and axial translation of the vectoring ring.

6 Claims, 4 Drawing Sheets

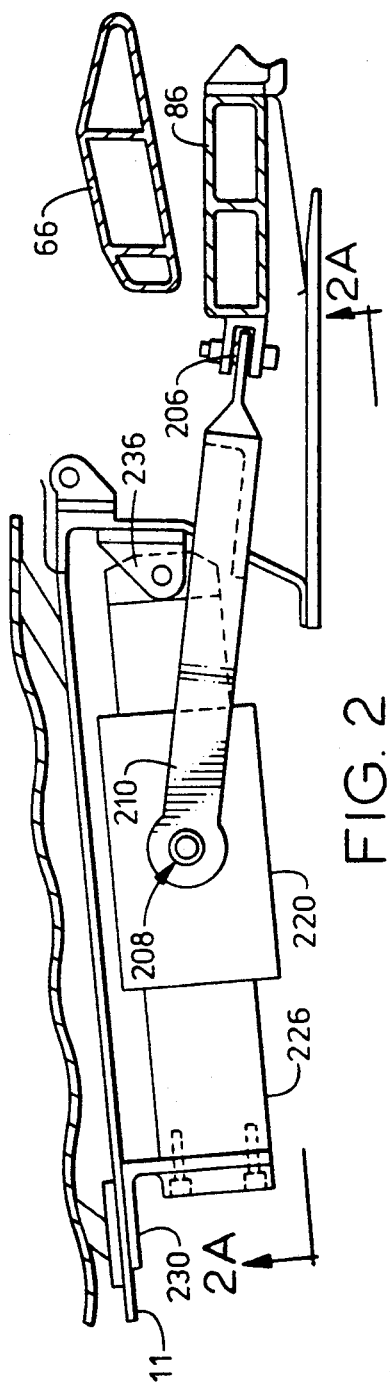
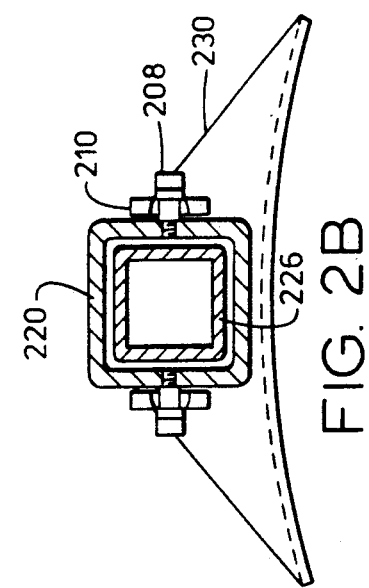
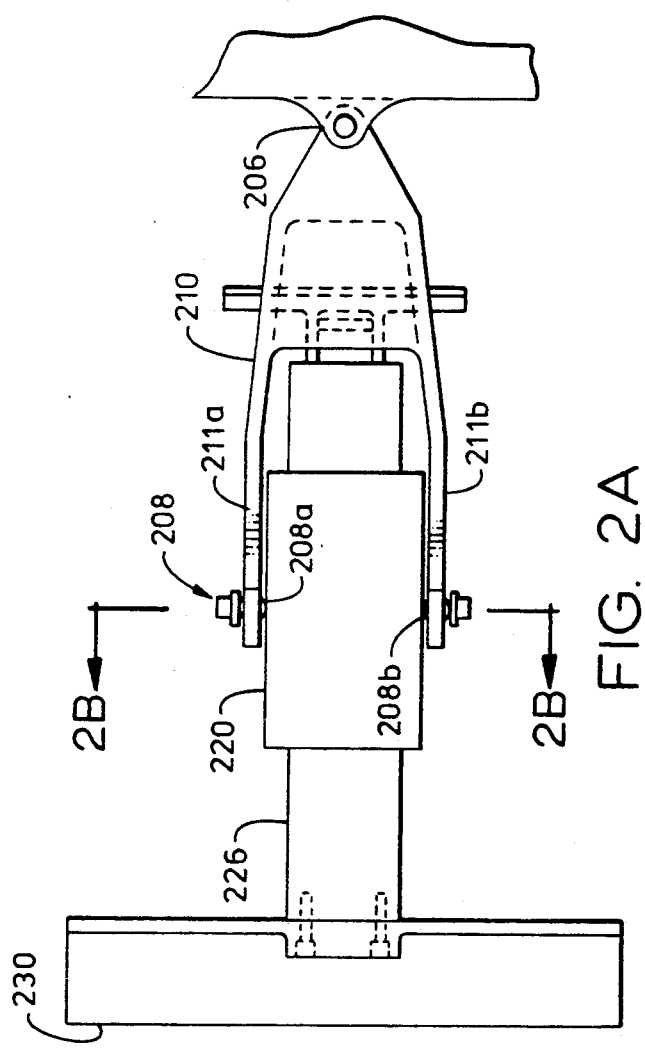

SUPPORT FOR A TRANSLATING NOZZLE VECTORING RING

BACKGROUND OF THE INVENTION

1. Field of the Invention

This invention relates generally to axisymmetric variable throat thrust vectoring nozzles and, more particularly, to the support apparatus of the vectoring ring that is used to pivot the nozzle flaps that vector the nozzle exhaust flow.

2. Description of Related Art

For military aircraft applications, there exists a need to increase the maneuverability of the aircraft both for air to air combat missions and complicated ground attack missions. Aircraft designers seek to replace or augment the use of conventional aerodynamic surfaces such as flaps and ailerons with vectorable nozzles which turn or vector the exhaust flow and thrust of the gas turbine engine powering the aircraft. Hauer in U.S. Pat. No. 4,994,660, herein incorporated by reference, discloses an axisymmetric vectoring exhaust nozzle that provides a means for vectoring the thrust of an axisymmetric convergent/divergent nozzle by universally pivoting the divergent flaps of the nozzle in an asymmetric fashion or in other words pivoting the divergent flaps in radial and tangential directions with respect to the unvectored nozzle centerline. The flaps are pivoted by a vectoring ring which can be axially translated and gimballed or tilted about its horizontal and vertical axis (essentially have its attitude adjusted) through a limited range. Previously, two dimensional nozzles have used vectored thrust means that employ relatively flat flaps to direct the pitch or yaw direction of the engine's thrust.

Vectored thrust produces tangential and radial loads referred to as side loads that are transmitted from the flaps by various load paths back to the engine casing through the actuators. These tremendous loads require heavy actuators to absorb the loads and particularly the bending moments exerted on the actuator shafts by thrust vectoring.

It is therefore one object of the present invention to provide a means to minimize or eliminate the side loads transferred by the nozzle to the actuators. It is another object of the present invention to reduce or eliminate the bending moments that the actuators would be subject to due to the radial loads. Another object is to minimize the size and weight of the nozzle actuators and hydraulic system used to power the actuators.

These objects and other features and advantages will become more readily apparent in the following description when taken in conjunction with the appended drawings.

SUMMARY OF THE INVENTION

Briefly, in accordance with one aspect of the present invention, a vectoring ring support apparatus is provided for transferring the side loads acting on a vectoring ring and generated by a gas turbine engine thrust vectoring nozzle to a relatively stationary portion of the engine. The support apparatus includes a means for allowing two degree of freedom (2DOF) pivotal motion and axial translation of the vectoring ring that is tied to the ends of the pivotal divergent flaps and therefore operable to vector the thrust and vary the exit area of the nozzle while preventing essentially all sideward, circumferential, or tangential movement of the vectoring ring.

The preferred embodiment of the invention provides three vectoring ring supports disposed in an equiangular manner circumferentially about the engine casing. The vectoring ring supports include a circumferential support means to transfer side loads from the vectoring ring to the engine casing, a vectoring ring translation means for allowing the ring to be translated, and a support pivoting means and ring gimballing means to allow the vectoring ring attitude adjustments by a set of linear actuators.

The preferred embodiment provides three vectoring support means including an axially translatable slider slidably mounted on a circumferential support means comprising an axially disposed slide bar that is rigidly attached to the engine casing. An A-frame has its double leg end pivotally attached to the slider and its other end connected to the vectoring ring by a 3 DOF joint in the form of a spherical joint.

An alternate embodiment provides a vectoring ring support means having a track and trolley arrangement in place of the slider and slider bar wherein the A-frame is pivotally attached to the trolley in a similar fashion. The track includes slotted rails operable to receive and guide four wheels disposed at the four corners of the trolley.

Yet another embodiment of the vectoring ring support apparatus in accordance with the present invention provides a trunnion mounted slide bearing apparatus wherein brackets mounted to the engine casing pivotally support a hollow linear bearing having a rod slidably mounted within. The slidable rod has aft and forward stops to prevent it from slipping out of the linear bearing and is attached, at its aft end, by a spherical joint to the vectoring ring.

Still another embodiment of the vectoring ring support apparatus in accordance with the present invention provides a folding link mechanism wherein the first link is essentially a rectangular frame pivotally connected to the engine casing and the second link is an A-frame having its two legs pivotally connected to the first link and its single leg end is attached by a spherical joint to the vectoring ring.

In the drawings as hereinafter described, a preferred embodiment is depicted; however, various other modifications and alternate constructions can be made thereto without departing from the true spirit and scope of the invention.

ADVANTAGES

Among the advantages provided by the vectoring ring support means of the present invention is the ability of the great reduction or even elimination of the side loads transferred to the vectoring ring actuators and the bending moments that the actuators and their arms would be subjected to.

Another advantage provided by the present invention is that it eliminates side loads while still permitting axial translation of the vectoring ring thereby allowing control of the expansion ratio (A9/A8). This results in significant performance improvements over fixed area ratio nozzles and also allows a wider range of vectoring angles to be used.

Another advantage is that the present invention requires smaller and thus lower weight nozzle actuators that are easier to mount to the engine than would otherwise be needed.

A further advantage is that the present invention distributes the side loads to locations other than where the actuators are mounted to the engine casing thereby providing a more even distribution of engine casing loads which allows for a lighter weight engine casing.

BRIEF DESCRIPTION OF THE DRAWINGS

The foregoing aspects and other features of the invention are explained in the following description, taken in connection with the accompanying drawings where:

FIG. 2 is a part side view and part cross sectional view of the preferred embodiment of the vectoring ring support means shown in FIG. 1.

FIG. 2A is a top view looking radially inward toward the engine centerline of the vectoring ring support means shown in FIG. 2.

FIG. 2B is an aft looking forward cross sectional view of the vectoring ring support means shown in FIG. 2A.

DESCRIPTION OF THE PREFERRED EMBODIMENT

Figure 1:
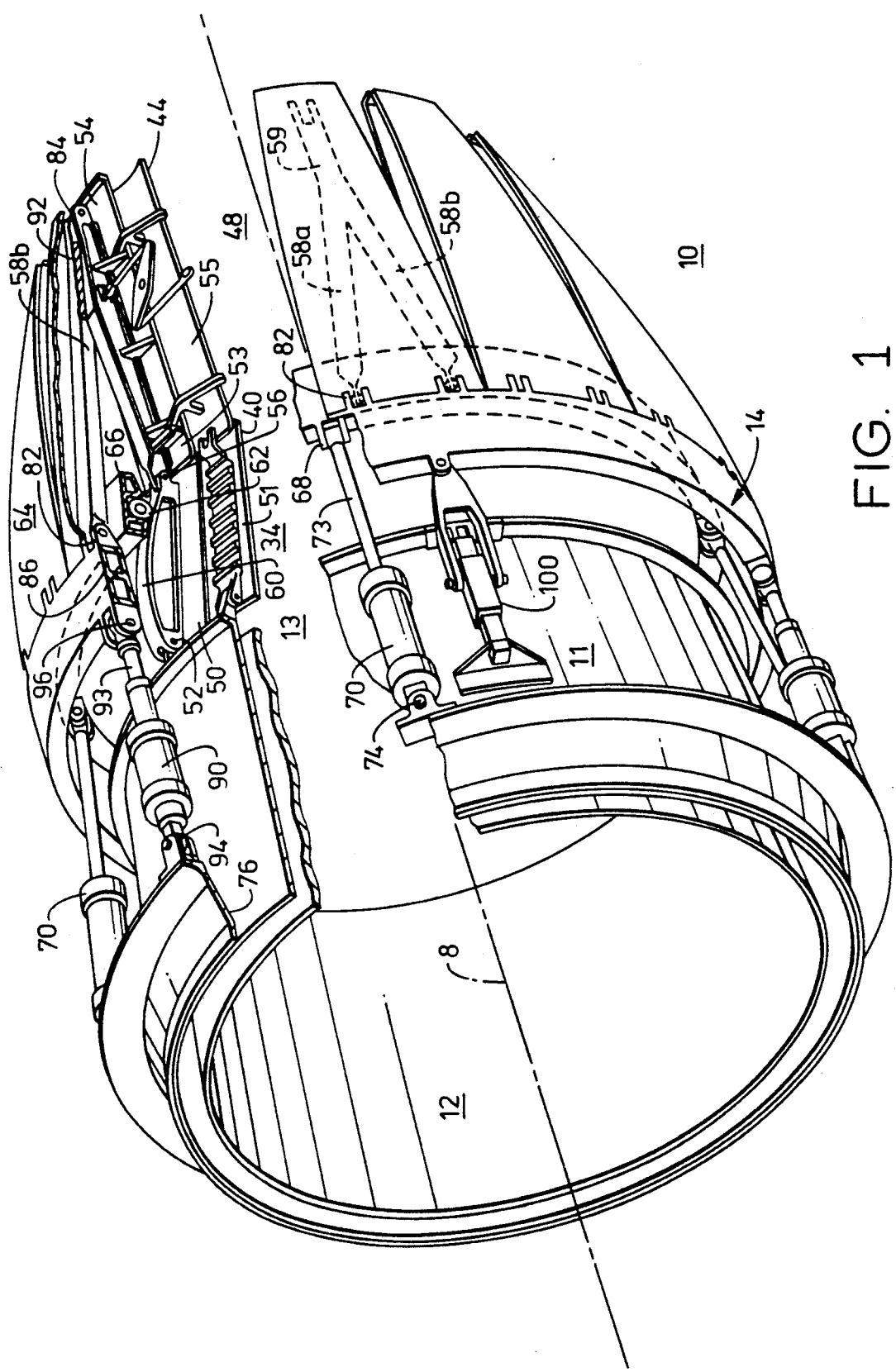
FIG. 1 is a partial cut away perspective view of a gas turbine engine axisymmetric vectoring exhaust nozzle with vectoring ring support means in accordance with the preferred embodiment of the present invention.

The present invention is generally shown in FIG. 1 as a vectoring ring support means 100 illustrated as part of an exhaust section 10 of a an aircraft gas turbine engine comprising in serial flow relationship a fixed area duct or engine casing 11, including an afterburner liner 12, and a variable area downstream section 13 having an axisymmetric vectoring nozzle 14 of the convergent divergent type as referenced previously in the Hauer patent.

Referring to FIG. 1, nozzle 14 comprises in serial flow relationship a convergent section 34, a throat 40 and a divergent section 48. The convergent section 34 includes a plurality of convergent or primary flaps 50 circumferentially disposed about engine centerline 8 with overlapping primary seals 51 disposed between and in sealing engagement with the radially inward facing surface of circumferentially adjacent primary flaps 50. Primary flap 50 is pivotally attached at its forward end to casing 11 by first pivotal or clevis joint 52. A divergent or secondary flap 54 is pivotally attached at its forward end 53 to the aft end of primary flap 50 by a universal two degree of freedom (2DOF) joint means 56 generally at an axial position in the nozzle 14 which coincides with throat 40. Secondary flaps 54 are generally circumferentially disposed about engine centerline 8 with overlapping divergent or secondary seals 55 disposed between and in sealing engagement with the radially inward facing surface of circumferentially adjacent secondary flaps 54. Throat 40 has associated with it a throat area conventionally referred to as A8 and the nozzle exit 44 is generally at the end of secondary flaps 54 and has an exit area associated with it conventionally referred to as A9.

A plurality of rollers 62 are disposed in a primary ring structure 66 which in turn is translated forward and aft by a plurality of primary actuators 70, of which there are four in the preferred embodiment. The variable throat area A8 is controlled by the action of cam roller 62 on the cam surface 60 which is formed on the back of primary flap 50. During operation the high pressure of the exhaust gases within the nozzle force primary flaps 50 and secondary flaps 54 radially outward thus keeping cam 60 in contact with cam roller 62. A conical annular actuator support 76 is mounted at its narrow forward end to engine casing 11 and primary actuator 70 is pivotally connected to the wide aft end of conical annular support 76 by a universal ball joint 74. Primary actuator 70 has an actuator rod 73 which in turn is connected to primary ring structure 66 by a spherical joint 68.

A plurality of vectoring actuators 90, of which there are three in the preferred embodiment, are equiangularly disposed circumferentially around case 11 and mounted to conical support 76 by universal ball joints 94 in a similar manner as actuators 70. A vectoring ring 86 is connected to vectoring actuators 90 at the aft end of a vectoring actuator rod 93 by a spherical joint 96. This provides for secondary vectoring ring 86 to be axially translated and tilted about centerline 8 in order to control its attitude. Vectoring ring 86 controls the positioning or pivoting of secondary flaps 54. Secondary flap 54 is pivotally connected to primary flap 50 by a 2 DOF universal joint 56 and is pivotally controlled in a multidegree of freedom manner by a plurality of respective Y-frames 59 having control arms 58a and 58b that operably connect secondary vectoring ring 86 to secondary flap 54. Outer flaps 64 are at least partially supported by Y-frames 59 and provide a clean and smooth aerodynamic shape along the exterior of the nozzle.

Control arms 58a and 58b are connected to vectoring ring 86 by 3DOF spherical joints 82 and to the aft end of secondary flap 54 by a spherical joint 84. This linkage is operable to translate an attitude change of secondary ring 86 into a multi degree of freedom pivoting change or orbital movement of secondary flap 54 whereby each secondary flap may be pivoted through a different angle. The use of spherical joints 82 to attach control arms 58a and 58b provides clevis type pivoting of Y-frame 59 while preventing any twisting loads that may be imparted to either control arms 58a or 58b from being transferred back to vectoring ring 86. Backbone 92 provides a mount for secondary flap 54 and support for joints 84 and 56 at its two ends.

Vectoring ring 86 is supported by three axially adjustable vectoring ring support means 100, equiangularly disposed circumferentially about casing 11, that allows vectoring ring 86 to be axially translated and gimballed by vectoring actuators 90. A preferred embodiment of axially adjustable vectoring ring support means 100 of the present invention is more particularly shown in FIGS. 2, 2a, and 2b wherein an axially translating A-frame 210 supports vectoring ring 86 by a 3 DOF spherical joint 206. A-frame 210 is pivotally attached to a slider 220 a clevis type hinge means 208 having at the ends of arms 211a and 211b two spherical joints 208a and 208b. The use of spherical joints at the ends of arms 211a and 211b provide clevis type pivoting for A-frame 210 and also eliminate the transfer of twisting loads that may be imparted to the arms. Slider 220 is slidable along a hollow slider bar 226 that is attached to engine casing 11 by forward bracket 230 and an aft bracket 236. Vectoring ring support means 100 permits vectoring ring 86 to translate axially forward and rearward and tilt so as to change its attitude. A-frame 210 pivots about hinge 208 to allow attitude adjustment or gimballing of the vectoring ring 86 and translates or slides along 226 in order to permit axial translation of the vectoring ring to provide control of exit area 44. Slide bar 226 absorbs circumferential loads from vectoring ring 86 so that the three vectoring ring supports 100 act together to prevent sideways movement of the vectoring ring.

Figure 3:
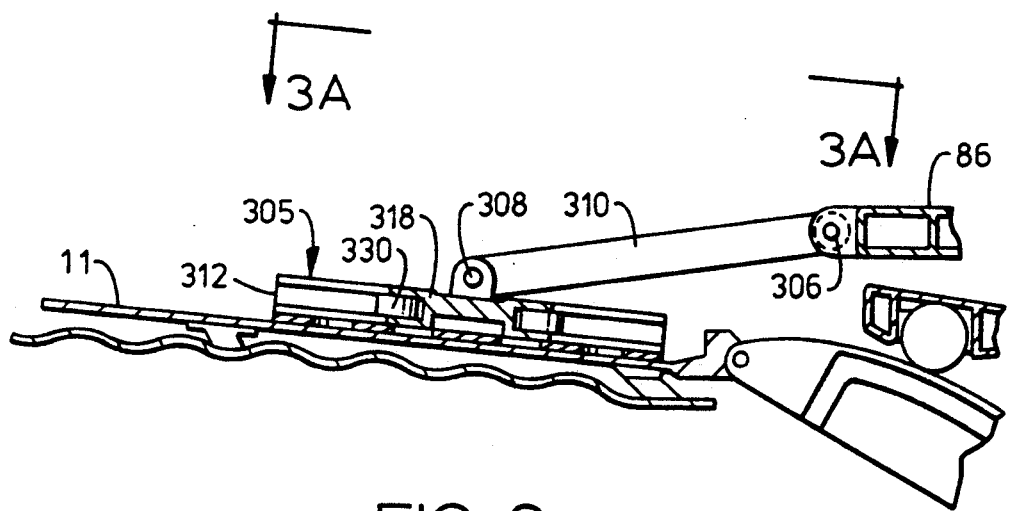
FIG. 3 is a cross sectional view of an alternative embodiment of the vectoring ring support means shown in FIG. 1.
Figure 3A:
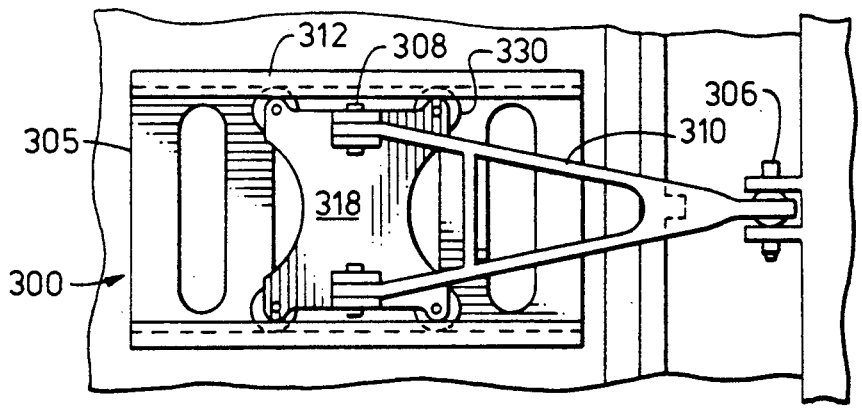
FIG. 3A is a top view looking radially inward toward the engine centerline of the vectoring ring support means shown in FIG. 3.

An alternative axially adjustable vectoring ring support means illustrated in FIGS. 3 and 3a is generally referred to as a track and trolley means 300 used to support vectoring ring 86. A track 305 having axially running slotted rails 312 is operable to receive and guide four guide wheels 330 disposed on the four corners of a trolley 318. An A-frame 310 is pivotally hinged by hinges 308 to trolley 318. Thus, providing radial and axial movement of vectoring ring 86 which is universally hinged to the aft end of A-frame 310 by a 3 DOF or spherical joint 306. Axial translation of vectoring ring 86 is provided by the axial movement of trolley 318 and the attached A-frame 310. Slotted rails 312 absorb the loads in the circumferential direction or side loads of the nozzle. Track 305 is suitably attached to engine casing 11 to provide the necessary load transfer mechanism from the vectoring ring 86 to engine casing 11.

Figure 4:
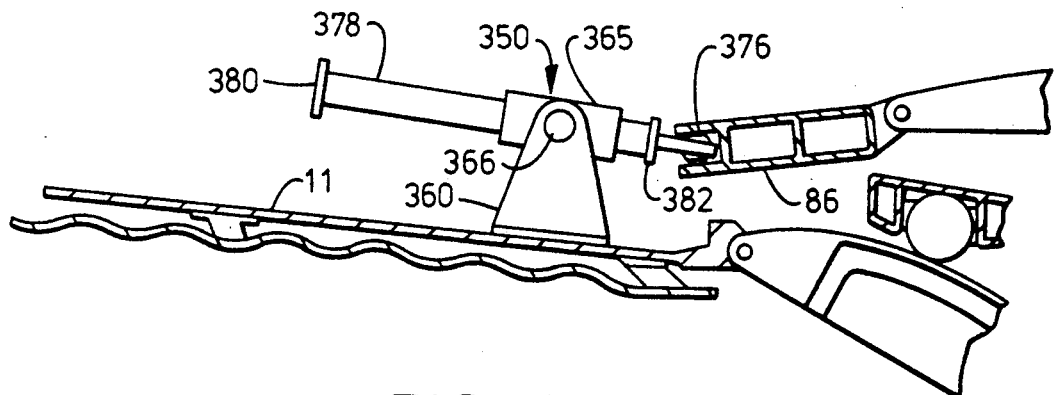
FIG. 4 is a part side view and part cross sectional view of a second alternative embodiment of the vectoring ring support means shown in FIG. 1.

FIG. 4 illustrates another embodiment of an axially adjustable vectoring ring support apparatus in accordance with the present invention. Shown in FIG. 4 is a trunnion slide bearing support means 350 including a bracket 360 attached to engine casing 11 supporting a trunnion mounted hollow linear barrel 365 by pin 366 having a slidable support rod 378 within. Support rod 378 includes forward and aft stops 380 and 382 respectively to prevent it from slipping out of barrel 365. A 3 DOF spherical joint 376 is used to mount vectoring ring 86 to the aft end of rod 378 thereby allowing rod 378 to pivot about pin 366 within linear barrel 365 and translate axially. Spherical joint 366 allows vectoring ring 86 to be pivoted to an attitude determined by the vectoring ring actuators 90 shown in FIG. 1. Rod 378 slidably mounted within linear barrel 365 provides circumferential support while permitting axial positioning for vectoring ring 86. Side loads are taken through rods 378 transferred to barrel 365 and finally to casing 11 through bracket 360.

Figure 5A:
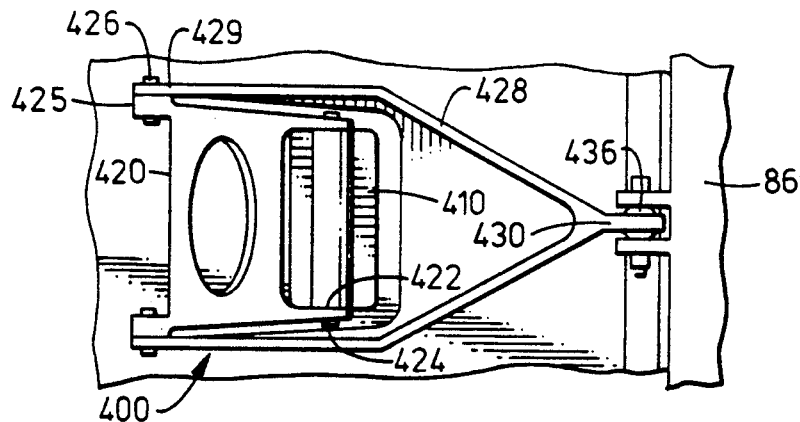
FIG. 5A is a top view looking radially inward toward the engine centerline of the vectoring ring support means shown in FIG. 5.
Figure 5:
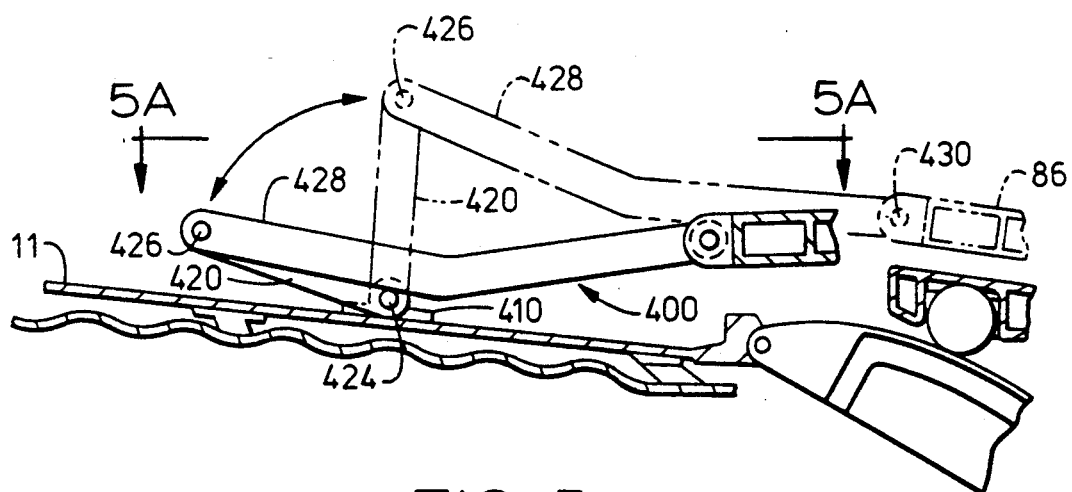
FIG. 5 is a part side view and part cross sectional view of a third alternative embodiment of the vectoring ring support means shown in FIG. 1.

Yet another alternative axially adjustable vectoring ring support means is illustrated in FIGS. 5 and 5A as a dual link support means 400. A rectangular first link 420 is pivotally attached to engine casing 11 by a hinge 410. Pin 424 pivotally connects a first end 422 of first link 420 to hinge 410 which is suitably mounted to engine casing 11. A distal second end 425 of first link 420 is pivotally connected to second link 428 preferably having a bent A-frame shape at its forward end 429. Bent end provides enhanced lever action for the linkage motion of the mechanism. A vectoring ring 86 is universally hinged to the aft end 230 of second link 428 by a 3 DOF or spherical joint 436. Axial translation and gimballing of vectoring ring 86 is allowed by the articulating movement of the pinned links 420 and 428 while side loads are absorbed by the links and pins to be transferred to engine casing 11.

While the preferred embodiment of our invention has been described fully in order to explain its principles, it is understood that various modifications or alterations may be made to the preferred embodiment without departing from the scope of the invention as set forth in the appended claims.

Having thus described what is considered novel and desired to be secured by Letters Patent of the United States, we claim:

1. A vectoring ring support for use in an aircraft gas turbine engine vectoring nozzle to support a vectoring ring, said vectoring ring support comprising:
    a circumferential ring support means to restrain circumferential movement of the vectoring ring and transfer side loads acting on the vectoring ring to a relatively stationary portion of the engine,
    pivoting means to allow said circumferential ring support means to pivot towards a center of the nozzle,
    an axial translational means for allowing axial translation of the vectoring ring, and
    a 3 degree of freedom (3 DO) means of attaching said support, said pivoting, and said axial translation means to the vectoring ring.

2. A vectoring ring support as claimed in claim 1 wherein:
    said circumferential ring support means comprises a slider bar,
    said axial translation means comprises a hollow slider slidably disposed on said slider bar, and
    said pivoting means comprises a frame having a first frame end pivotally attached to said slider and having said 3 DOF attachment means at another end of said frame.

3. A vectoring ring support as claimed in claim 1 wherein:
    said circumferential ring support means comprises an axially extending track having opposed slotted rails along axially extending sides of said track,
    said axial translation means comprises a trolley having at least four wheels operably mounted to said trolley so as to roll in the axial direction and travel and be retained within said slotted tracks, and
    said pivoting means comprises a frame having a first frame end pivotally attached to said track and having said 3 DOF attachment means at another end of said frame.

4. A vectoring ring support as claimed in claim 1 wherein:
    said circumferential ring support means and said pivoting means comprises a bracket means supporting a trunnion mounted hollow linear barrel,
    said axial translation means comprises a slidable support rod slidably mounted within said hollow linear barrel, and
    said 3 DOF attachment is disposed means at an axially aft end of said support rod.

5. A vectoring ring support as claimed in claim 1 wherein said circumferential ring support means, pivoting means, and axial translation means comprise:
    an axially extending multi-arm link having at least two links pivotally linked in series,
    wherein a first link is pivotally attached to said relatively stationary portion of the engine, and
    said 3 DOF attachment means is located at an aft end of a last one of said links.

6. A vectoring ring support as claimed in claim 5 wherein said multi-arm link is a two arm link including two links in the form of frames pivotally linked to each other and said second link is bent to improve lever action.

* * * * *